(12) United States Patent
Zhang et al.

(10) Patent No.: US 8,099,408 B2
(45) Date of Patent: Jan. 17, 2012

(54) WEB FORUM CRAWLING USING SKELETAL LINKS

(75) Inventors: Lei Zhang, Beijing (CN); Wei-Ying Ma, Beijing (CN); Wei Lai, Beijing (CN); Jiangming Yang, Beijing (CN); Rui Cai, Beijing (CN)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 12/163,895

(22) Filed: Jun. 27, 2008

(65) Prior Publication Data

US 2009/0327237 A1 Dec. 31, 2009

(51) Int. Cl.
*G06F 7/06* (2006.01)
*G06F 17/30* (2006.01)
(52) U.S. Cl. ......... 707/709; 707/711; 707/737; 707/736
(58) Field of Classification Search .............. 707/3, 102, 707/999.003, 999.102, 79, 736, 5, 104.1, 707/999.005, 999.107, 709, 711, 737
See application file for complete search history.

(56) References Cited

U.S. PATENT DOCUMENTS

| | | |
|---|---|---|
| 6,269,370 B1 | 7/2001 | Kirsch |
| 6,418,453 B1 | 7/2002 | Kraft et al. |
| 7,080,073 B1 | 7/2006 | Jiang et al. |
| 7,315,861 B2 | 1/2008 | Seibel et al. |
| 2004/0225644 A1 | 11/2004 | Squillante et al. |
| 2005/0086206 A1 | 4/2005 | Balasubramanian et al. |
| 2006/0129446 A1 | 6/2006 | Ruhl et al. |
| 2007/0100779 A1 | 5/2007 | Levy et al. |
| 2007/0208703 A1 | 9/2007 | Shi et al. |
| 2009/0265363 A1 | 10/2009 | Lai et al. |

OTHER PUBLICATIONS

Baeza-Yates, R., et al., "Crawling a Country: Better Strategies Than Breadth-First for Web Page Ordering," In Proc. 14th WWW, Chiba, Japan, May 10-14, 2005, 9 pages.
Cai, R., et al., "iRobot: An Intelligent Crawler for Web Forums," WWW 2008, Beijing, China, Apr. 21-25, 2008, 10 pages.
Crescenzi, V., et al., "Clustering Web Pages Based on Their Structure," Data & Knowledge Engineering 54, 2005, pp. 279-299.
Heydon, A., et al., "Mercator: A Scalable, Extensible Web Crawler," World Wide Web, 1999, vol. 2, pp. 1-15.
Lage, J., et al., "Automatic Generation of Agents for Collecting Hidden Web Pages for Data Extraction," Data & Knowledge Engineering 49, 2004, pp. 177-196.
Meng, X. et al., "Recipe Crawler: Collecting Recipe Data from WWW Incrementally," Lecture Notes in Computer Science, Springer Berlin, Heidlberg, Germany, vol. 4016, 2006, 8 pages.
Provos, Niels, "Crawl—A Small and Efficient HTTP Crawler," http://monkey.org/~provos/crawl/, 2 pages, [Last accessed Sep. 13, 2010].

(Continued)

*Primary Examiner* — James Trujillo
*Assistant Examiner* — Bruce Moser
(74) *Attorney, Agent, or Firm* — Perkins Coie LLP (57) ABSTRACT

A method and system for identifying informative links of a web site for use in crawling the web site is provided. A forum crawler analyzes sample web pages of a web forum to identify informative links and then crawls the web forum by following links determined to be informative and not following other links. The forum crawler system determines whether links are informative based on whether they are part of the overall structure of the web site or are used to select sequential information that has been split onto multiple web pages.

17 Claims, 11 Drawing Sheets

OTHER PUBLICATIONS

Raghavan, S., "Crawling The Hidden Web," In Proc. 27th VLDB Conference, Roma, Italy, 2001, 10 pages.

Vidal, M., et al., "Structure-Driven Crawler Generation by Example," In Proc. of SIGIR 2006, Seattle, Washington, USA, Aug. 6-11, 2006, pp. 292-299.

Wang, Y., et al., "Exploring Traversal Strategy for Web Forum Crawling," SIGIR 2008, Singapore, Jul. 20-24, 8 pages.

WEB FORUM CRAWLING USING SKELETAL LINKS

BACKGROUND

A web forum is a web site that typically allows users of the web site to post information that is available to be viewed by other users of the web site. Web forums provide a vast amount of information on a wide range of topics. Many web forums are dedicated to a specific topic. Such a web forum may have many different discussion threads relating to the topic. A user of such a web forum can select a discussion thread and then participate in the discussion. Other web forums may have discussion threads relating to many topics that may be hierarchically organized. To participate in a discussion, a user of such a web forum first selects a topic and then selects the discussion thread of interest. A discussion thread is typically initiated when a person creates an initial message directed to a topic and posts the message as a new discussion thread. Other persons can read the initial message and post response (or reply) messages to the discussion thread. For example, the initial message may pose a question such as "Has anyone encountered a situation where the Acme software product aborts with error number 456?" Persons who want to participate in the discussion can post response messages such as "It happens to me all the time" or "I fixed the problem by reinstalling the software." Discussion threads typically take the form of a tree structure as sequences of messages branch off into different paths. For example, three different persons can post a response message to the initial message, starting three branches, and other persons can post response messages to any one of those response messages to extend those branches.

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Search engine services, however, do not perform well when crawling a web forum, for various reasons. One reason is that a typical web forum has many pages with very little informational content that is of interest to a user who is searching on a specific topic. For example, each posting page may have a link to a reply page without a quotation and a link to a reply page with a quotation. These reply pages, however, contain no additional informational content that would be of interest to a user that is not already on the posting page. Another reason is that many web forums prohibit unregistered users from accessing user profiles. As a result, if a crawler does not use cookies, all accesses to profile pages will actually access a login page, which has no informational content of interest. Because of these and other reasons, current search engine services perform slowly when crawling a web forum and spend a considerable amount of time accessing web pages with no informational content of interest.

SUMMARY

A method and system for identifying informative links of a web site for use in crawling the web site is provided. A forum crawler analyzes sample web pages of a web forum to identify informative links and then crawls the web forum by following links determined to be informative and not following other links. To identify informative links, the forum crawler system may randomly collect web pages of the web forum that is to be crawled. The forum crawler system then generates a site map of the web site based on the collected web pages. A site map represents clusters of similar web pages as vertices of the site map and inter-cluster and intra-cluster references (e.g., hyperlinks or links) between the web pages of the clusters as links between the vertices. The forum crawler system analyzes the generated site map to identify the informative links. The forum crawler system the crawls then web site following the informative links but not following other links.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for identifying informative links of a web site (e.g., a web forum) for use in crawling the web site is provided. In some embodiments, a forum crawler analyzes sample web pages of a web forum to identify informative links and then crawls the web forum by following links determined to be informative and not following other links. The forum crawler system determines whether links are informative based on whether they are part of the overall structure of the web site or are used to select sequential information that has been split onto multiple web pages. To identify informative links, the forum crawler system may randomly collect web pages of the web forum that is to be crawled. The forum crawler system then generates a site map of the web site based on the collected web pages. A site map represents clusters of similar web pages as vertices of the site map and inter-cluster and intra-cluster references (e.g., hyperlinks or links) between the web pages of the clusters as links between the vertices. Techniques for generating a site map are described in U.S. patent application Ser. No. 12/103,712, entitled "Forum Web Page Clustering based on Repetitive Regions" and filed on Apr. 16, 2008, which is hereby incorporated by reference. The forum crawler system analyzes the generated site map to identify the informative links, which include skeletal links and page-flipping links of the web site. A skeletal link is a link that supports the structure of the web site. For example, a web forum may have a web page containing a list of topics or discussion boards with links to web pages listing discussion threads for the topics, referred to as list of threads web pages. The list of threads web pages have links to web pages for the postings of discussions, referred to as posts of thread web pages. Each of these links is part of the overall structure of the web forum and is thus referred to as a "skeletal" link. The forum crawler system may also identify page-flipping links. A page-flipping link is a link that is used to connect the pages of a single discussion thread. When a discussion thread is long, the web forum may divide the postings into multiple posts of thread web pages. Each posts of thread web page may have links to navigate to the previous and next web pages within the discussion thread. These links are considered "page-flipping" links because they are used to flip between different postings of a web page. Skeletal links and page-flipping links are considered informative links because they provide access to the information content of a web site. Other links, such as links to logon pages, shortcut links, and navigation links between discussion threads, can lead to web pages that are duplicative of the web pages referenced by informative links or may lead to web pages that are not informative (e.g., a logon web page). After the informative links are identified, the forum crawler system can then crawl the entire web site using the informative links to guide the crawling. In particular, the forum crawler system follows the informative links but does not follow other links.

Figure 1:
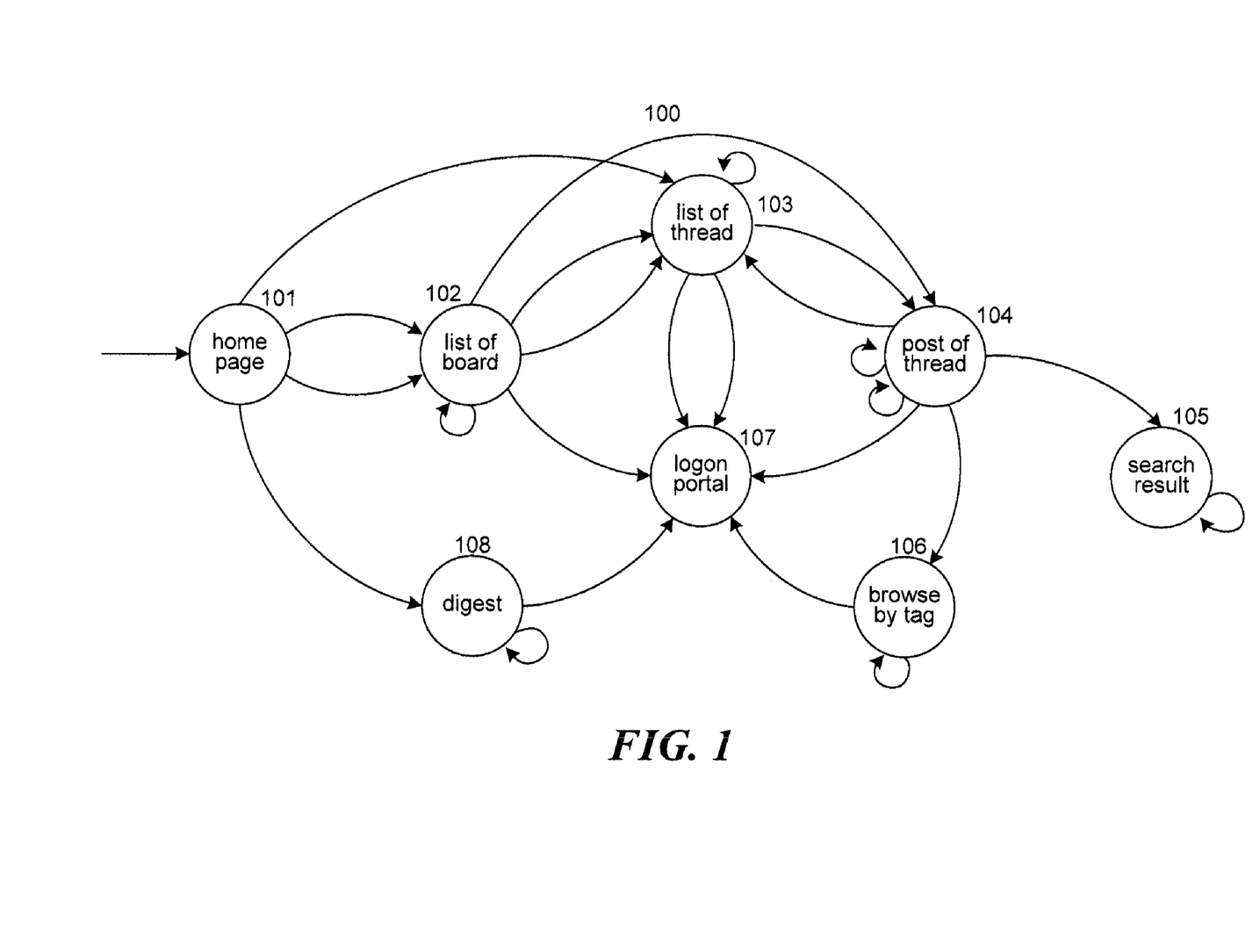
FIG. 1 is a block diagram that illustrates a site map of a web forum in some embodiments.

FIG. 1 is a block diagram that illustrates a site map of a web forum in some embodiments. The site map 100 includes vertices 101-108 and various links between the vertices. Each vertex corresponds to a cluster of similar web pages of the web forum. For example, vertex 102 corresponds to list of boards web pages of the web forum. The links from vertex 102 to vertex 103 represent different types of links from list of boards web pages to list of threads web pages represented by vertex 103. One type of link may represent a skeletal link, and the other type of link may represent a shortcut link. For example, a list of boards web page may include a listing of bulletin boards with links to list of threads web pages for the board. Such links represent skeletal links. In contrast, a list of boards web page may include a shortcut to the most popular board. The forum crawler system may identify different types of links of a web page based on location of the links and the patterns within the URLs of the links. Since a shortcut link points to the same list of threads web page as another link within the list of boards, it is thus considered to be a non-informative link. A link with the same from and to vertex represents a type of intra-vertex or intra-cluster link. Such a link may represent a page-flipping link or a shortcut to the first or last web page in a thread that spans multiple web pages.

Figure 2A:
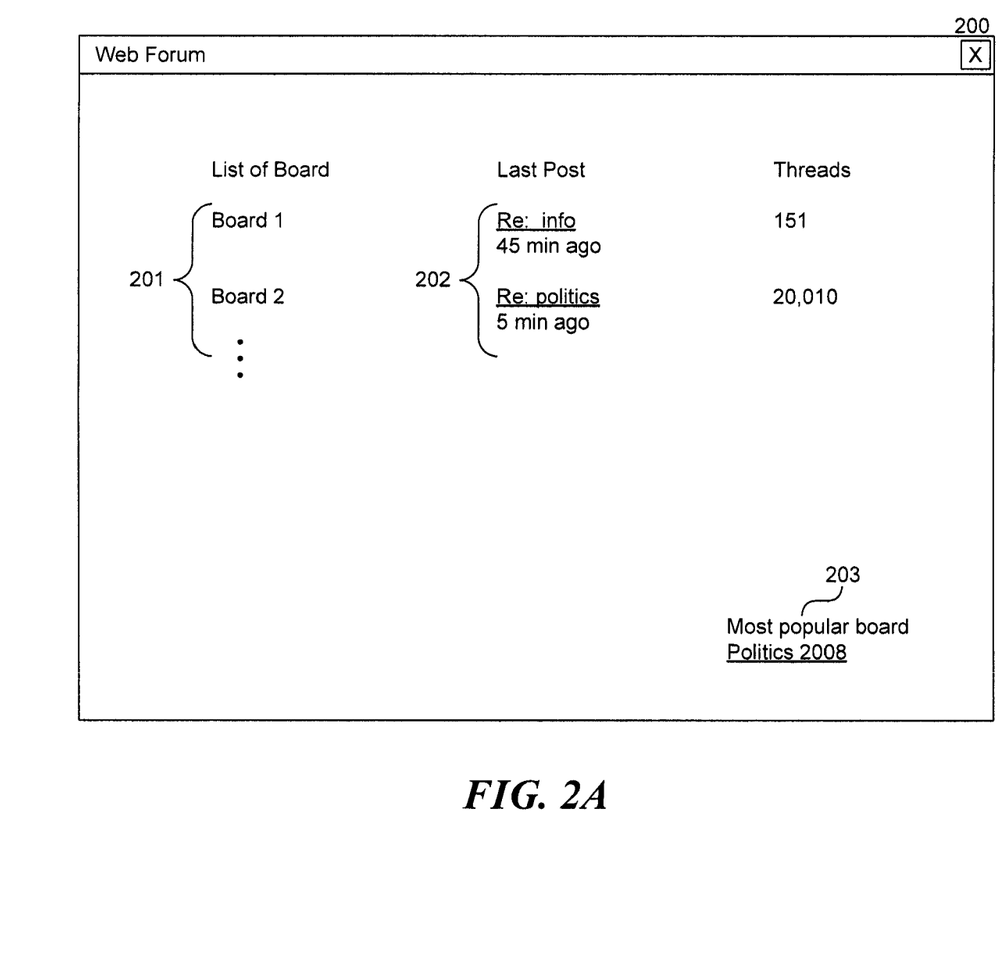
FIG. 2a is a display page illustrating the list of boards of a web forum in some embodiments.

FIG. 2a is a display page illustrating the list of boards of a web forum in some embodiments. Display page 200 includes a list of boards area 201, a last post area 202, and a most popular board area 203. The list of boards area contains links to each board supported by the web forum. These links are skeletal links of the web forum. The last post area contains links to the last post of each board; these links are not skeletal links as they are duplicates of links that would be found on a list of threads web page. The most popular board area contains a link to the most popular bulletin board; this link is not a skeletal link as it is a duplicate of a link that would be found in the list of boards. Although the URL patterns within the links within the list of boards area and the most popular board area are similar, the locations of the links on the web page are different and thus represent different types of links. Thus, the forum crawler system represents the different links with two different links on the site map.

Figure 2B:
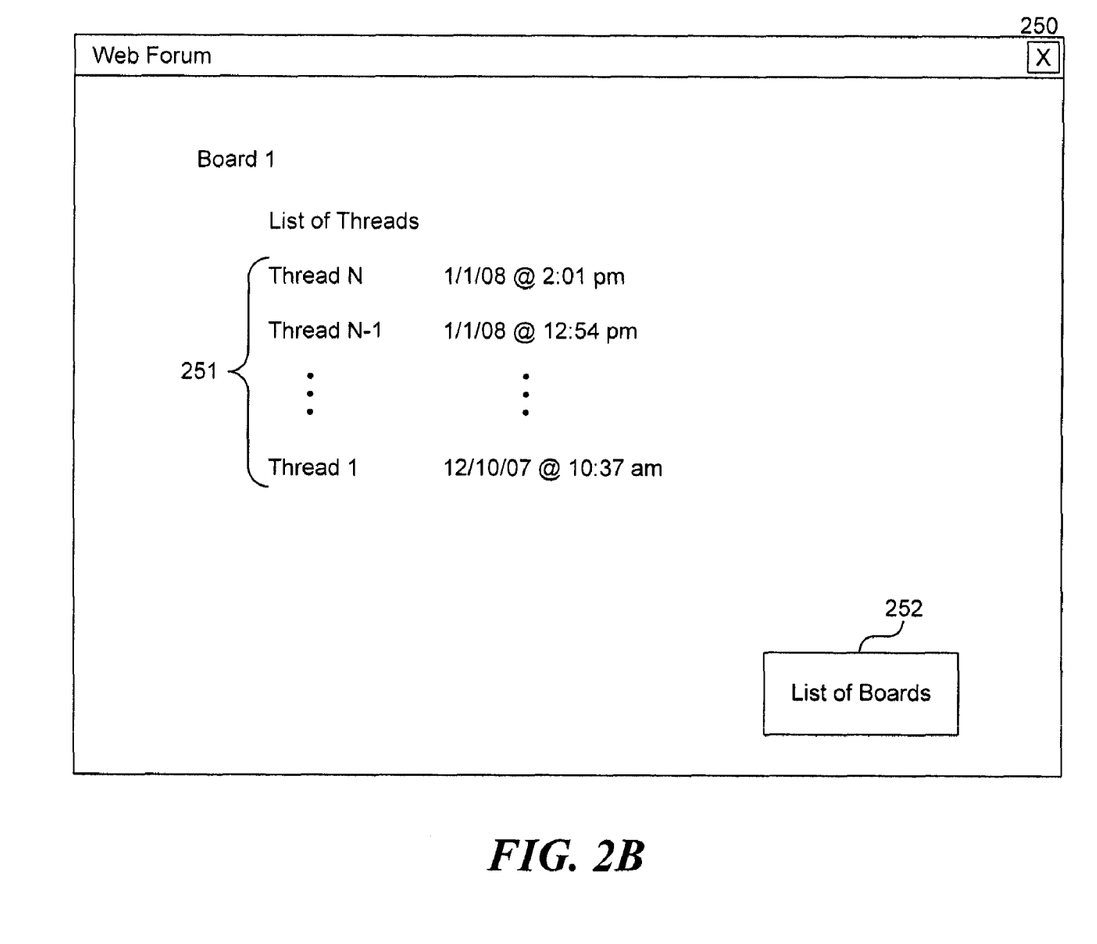
FIG. 2b is a display page illustrating the list of threads of a web forum in some embodiments.

FIG. 2b is a display page illustrating the list of threads of a web forum in some embodiments. Display page 250 includes a list of threads area 251 and a list of boards button 252. The list of threads area contains links to the posts of thread web page for each thread within "Board 1." The list of threads area also includes an associated date for each thread (e.g., date of first or last post in the thread). The links to the posts of thread web pages are skeletal links of the web forum. The list of boards button is a return link to the list of boards web page and is not skeletal link.

Figure 3:
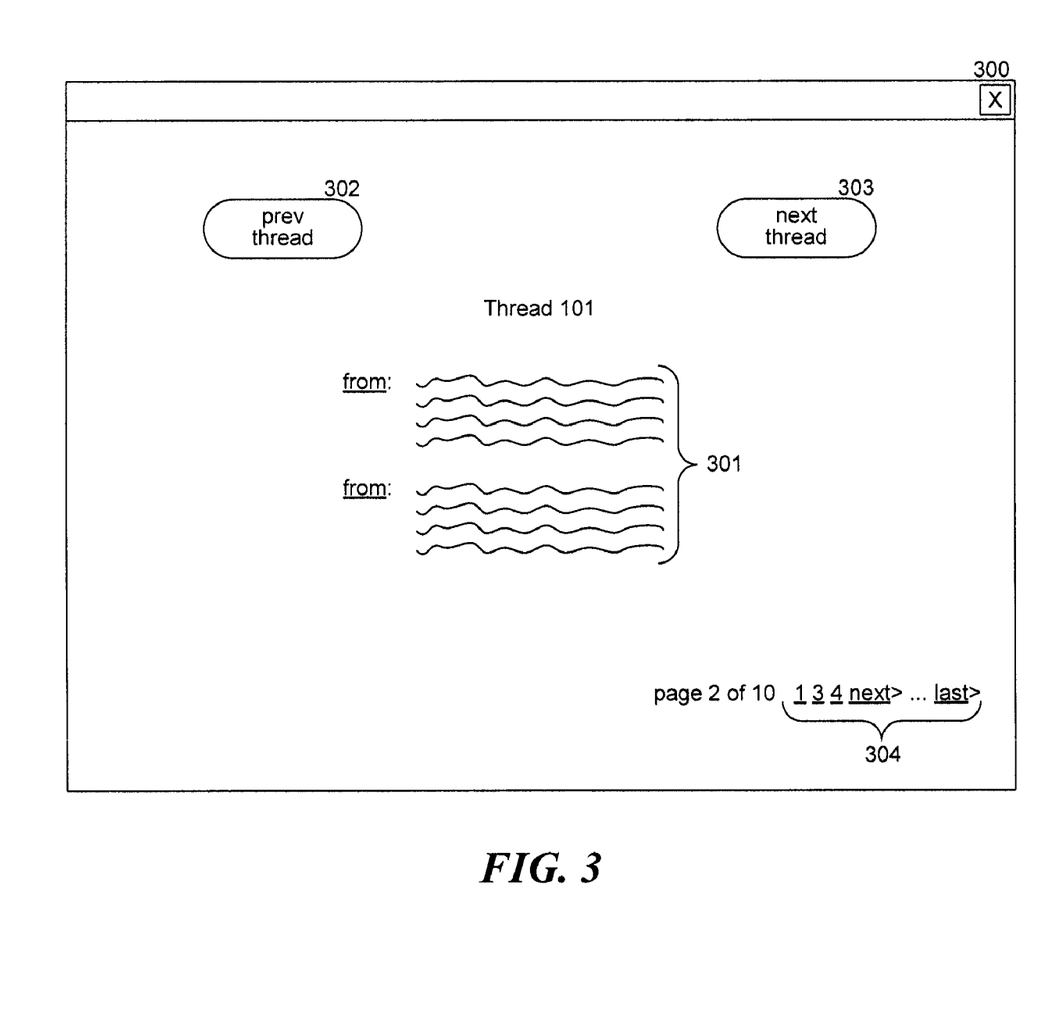
FIG. 3 is a display page that illustrates a posts of thread web page of a web forum in some embodiments.

FIG. 3 is a display page that illustrates a posts of thread web page of a web forum in some embodiments. Display page 300 includes a postings area 301, a previous thread link 302, a next thread link 303, and intra-thread links 304. The posting area contains the postings of the discussion thread. The previous thread link and the next thread link are links to different threads within the bulletin board. The previous and next thread links are not skeletal links because they are duplicates of links found on the list of threads web page for the board. The links from vertex 104 back to vertex 104 of FIG. 1 may represent such previous and next links. The intra-thread links represent links of different types between different web pages of the same discussion thread. The display page is currently displaying page 2 of 10 web pages that the discussion thread spans. The links numbered 1, 3, and 4 and the links labeled next and last represent page-flipping links to the web pages of the discussion thread. Each of page-flipping links will typically have the same pattern such as "*&pageid=1," "*&pageid=3," "*&pageid=4," and so on. The links from vertex 104 to vertex 104 represent these intra-thread links.

The organizational structure of web forums has skeletal links that typically have several characteristics in common. One characteristic is that skeletal links point to those vertices containing valuable and informational web pages, such as the list of threads web pages and posts of thread web pages. If one skeletal link is missed, the crawler may miss a number of valuable web pages. Thus, it may be necessary to have a complete set of skeletal links to retrieve all the valuable web pages in a web forum. Another characteristic is that skeletal links should not result in redundant crawling and non-informative information. That is, a link is not a skeletal link if it points to many duplicate web pages or non-informative web pages (e.g., a logon failure prompt). Skeletal links of the site map of FIG. 1 may include the links from vertex 101 to vertex 102, from vertex 102 to vertex 103, and from vertex 103 to vertex 104.

The forum crawler system uses a metric to measure whether a link likely satisfies the characteristics of a skeletal link. In some embodiments, the forum crawler system generates a measurement that is based on redundant information that is encountered during crawling. Many non-informative web pages of a web forum are clusters of duplicate web pages. For example, logon prompt web pages of a web forum are typically exactly the same web page.

The forum crawler system uses coverage and informativeness to measure these characteristics of a link. For each vertex of the site map, if the number of sampled web pages is N, then the forum crawler system represents the number of unique web pages after duplicate or near-duplicate detection as K. The coverage of a cluster represents the ratio of the number of unique web pages of that cluster encountered during a certain non-exhaustive traversal compared to the number of unique web pages that would be encountered during an ideal or exhaustive traversal. The coverage measure of a cluster is represented by the following:

$$Cov = \frac{K'}{K} \times 100\% \qquad (1)$$

where Cov represents the coverage measure of the cluster, K represents the number of unique web pages using an exhaustive traversal, and K' represents the number of unique web pages using a non-exhaustive traversal. The informativeness measure represents the informational content of a cluster of wet) pages and may be represented by the following:

$$Info = -\frac{1}{\log(N)} \sum_{i=1}^{K} \frac{\|D_i\|}{N} \log\left(\frac{\|D_i\|}{N}\right) \qquad (2)$$

where Info represents the informativeness measure of a cluster, $D_i$ represents the $i^{th}$ unique web page within the cluster, and $\|D_i\|$ represents the number of duplicate web pages of the unique web page $D_i$.

The forum crawler system could generate a coverage measure and an informativeness measure for each link of the site map independently. However, such an approach will not guarantee a globally optimal set of skeletal links as these measures will vary based on what other links are considered to be skeletal links. Thus, the forum crawler system attempts to identify an optimal set of skeletal links by evaluating the links of the site map designated as skeletal and non-skeletal links by evaluating various combinations of designations. The forum crawler system processes the links of the site map on a vertex-by-vertex basis. For each vertex of the site map, the forum crawler system considers all incoming links to that vertex ($\{L_1, \ldots, L_m\}$), including the intra-cluster links, as candidates to be skeletal links to the vertex. Since each candidate link LA may be selected as a skeletal link or not, the search space consists of $2^m$ states. The web forum crawler represents the search space as an m-level binary tree, and the two sub-trees under a node represent the decisions of whether a link is a skeletal link or not.

Figure 4:
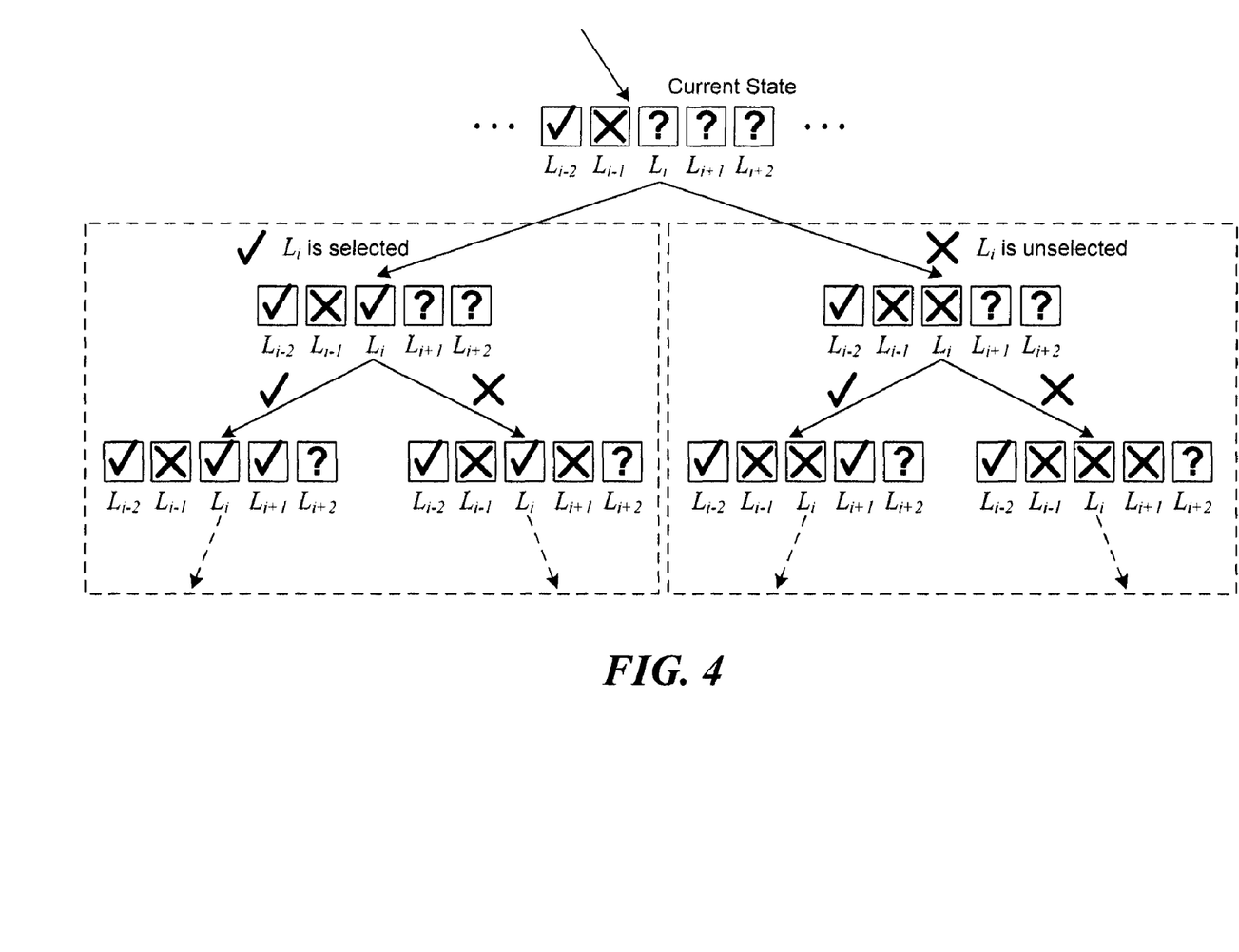
FIG. 4 is a diagram that illustrates the binary tree search space in some embodiments.

FIG. 4 is a diagram that illustrates the binary tree search space in some embodiments. The check marks indicate that the corresponding link represents a skeletal link, the Xs indicate that corresponding link represents a non-skeletal link, and the question marks indicate that the status of the corresponding link is yet to be determined.

The forum crawler system need not search all possible combinations. If not selecting a link as a skeletal link would result in a significant drop in coverage, then the forum crawler system selects that link as a skeletal link and can ignore all combinations with that link as a non-skeletal link. Similarly, if selecting a link as a skeletal link would result in a significant drop of informativeness, then the forum crawler system does not select the link as a skeletal link and can ignore all combinations with that link as a skeletal link. As described below in detail, the forum crawler system uses a threshold to evaluate the significance of the drop in coverage and informativeness.

The forum crawler system identifies page-flipping links on a vertex-by-vertex basis and considers only intra-cluster links of the site map as candidates to be page-flipping links. The forum crawler system uses a connectivity measure for assessing whether a link of the site map represents a page-flipping link. The connectivity measure represents a ratio of the number of web pages that have links of that type that link to each other. For example, two successive web pages of a discussion thread have links (e.g., next and previous) to each other. The forum crawler system defines a function Path(A,B) to represent whether there is a path from web page A to web page B of a cluster with a link of the same type. If there is such a path, then Path(A,B)=1, otherwise Path(A,B)=0. The forum crawler system represents the connectivity for a vertex for a certain type of link as follows:

$$Con = \frac{\sum_{\{A,B\}} Path(A, B) \cdot Path(B, A)}{\sum_{\{A,B\}} Path(A, B)} \qquad (3)$$

The numerator results in a count of the number of web page pairs that have a link of that certain type to another web page and the other web page has a link of that same certain type back to the web page. The denominator is a count of the number of web page pairs that have a link of that certain type between them. The forum crawler system selects as page-flipping links those links whose connectivity score is greater than the average connectivity score for all the intra-cluster links of the vertex.

Figure 5:
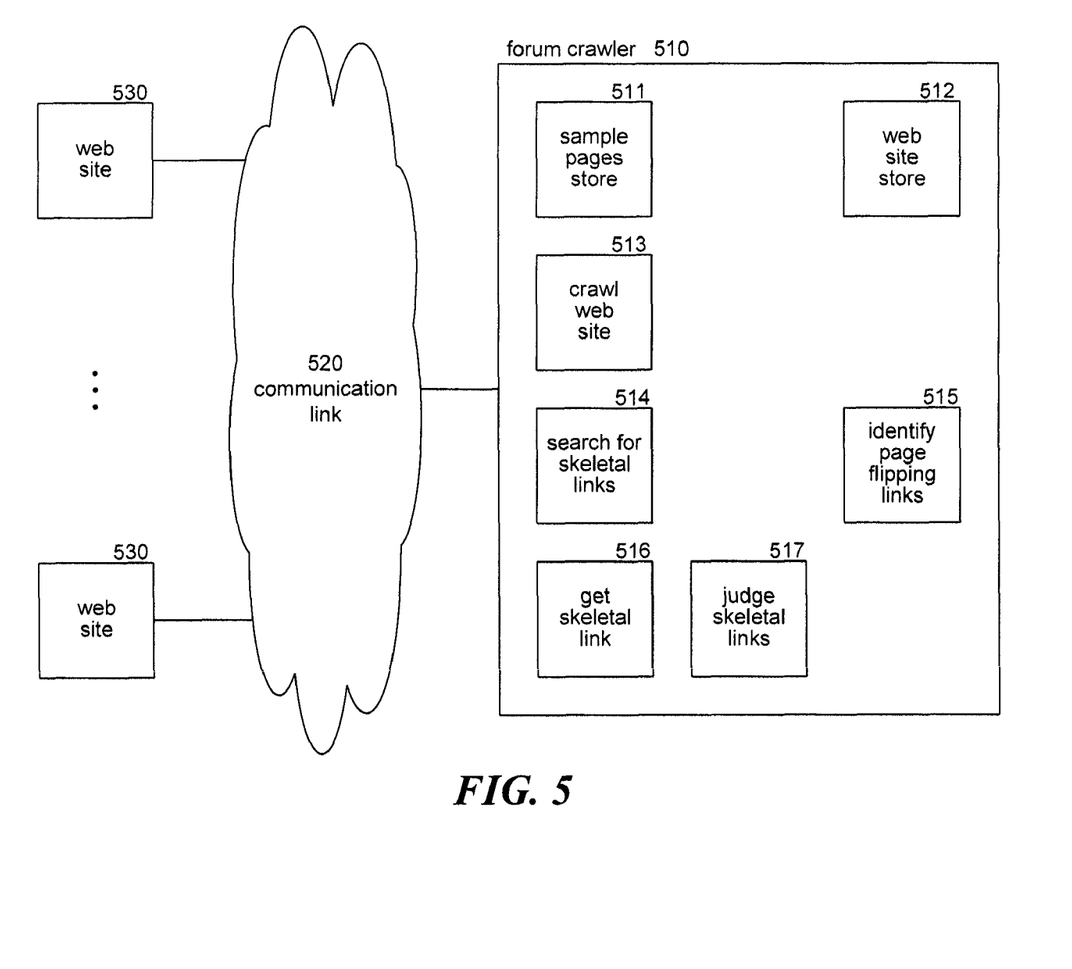
FIG. 5 is a block diagram that illustrates components of a forum crawler system in some embodiments.

FIG. 5 is a block diagram that illustrates components of a forum crawler system in some embodiments. A forum crawler system 510 may be connected to web sites 530 by a communication link 520. The forum crawler system may include a sample pages store 511 and a web site store 512. The sample pages store contains an indication of the sample web pages for use in generating the site map. The web site store contains the results of crawling a web site using the informative links. A crawl web site component 513 controls the generating of the site map, the identifying of informative links, and the crawling of the web site using the informative links. The crawl web site component invokes a search for skeletal links component 514 and an identify page-flipping links component 515. The search for skeletal links component invokes a get skeletal links component 516 and a judge skeletal links component 517 as described below in detail.

The computing device on which the forum crawler system is implemented may include a central processing unit, memory, input devices (e.g., keyboard and pointing devices), output devices (e.g., display devices), and storage devices (e.g., disk drives). The memory and storage devices are computer-readable media that may contain instructions that implement the forum crawler system. In addition, the data structures and message structures may be stored or transmitted via a data transmission medium, such as a signal on a communications link. Various communications links may be used, such as the Internet, a local area network, a wide area network, or a point-to-point dial-up connection.

The forum crawler system may be implemented or used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The forum crawler system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
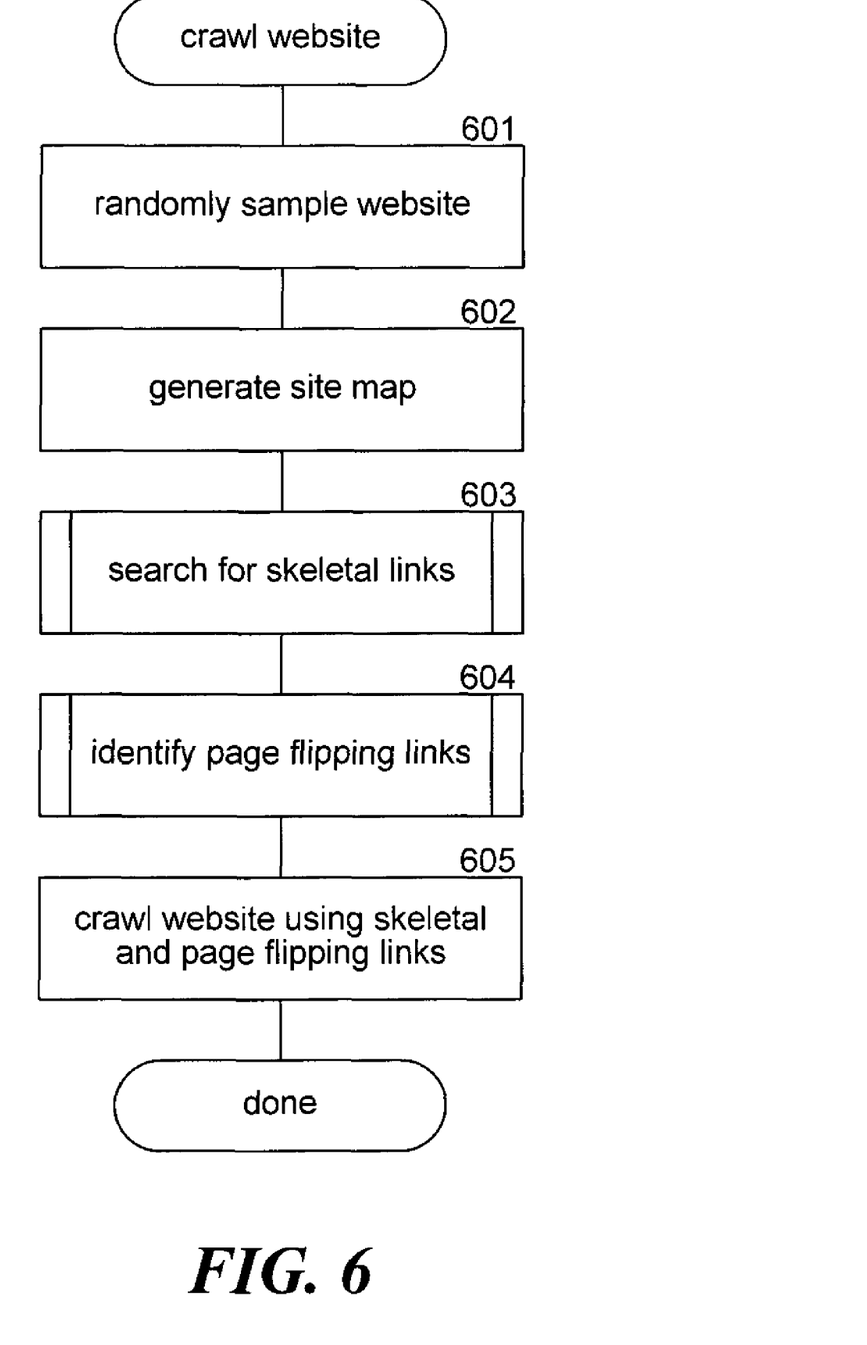
FIG. 6 is a flow diagram that illustrates the processing of the crawl web site component of the forum crawler system in some embodiments.

FIG. 6 is a flow diagram that illustrates the processing of the crawl web site component of the forum crawler system in some embodiments. The component controls the overall process of crawling a web site using informative links. The component may initially perform an exhaustive traversal of the web site, generate a site map, and determine the number of unique web pages for each cluster using the exhaustive traversal. In block 601, the component randomly samples the web site for web pages. In block 602, the component generates the site map from the sample web pages. In block 603, the component invokes the search for skeletal links component to identify the skeletal links from the site map. In block 604, the component invokes the identify page-flipping links component to identify the page-flipping links from the site map. In block 605, the component crawls the web site using the skeletal and page-flipping links to generate the information for the web site store and then completes. The component may also store an indication of the skeletal and page-flipping links for searching of the web site.

Figure 7:
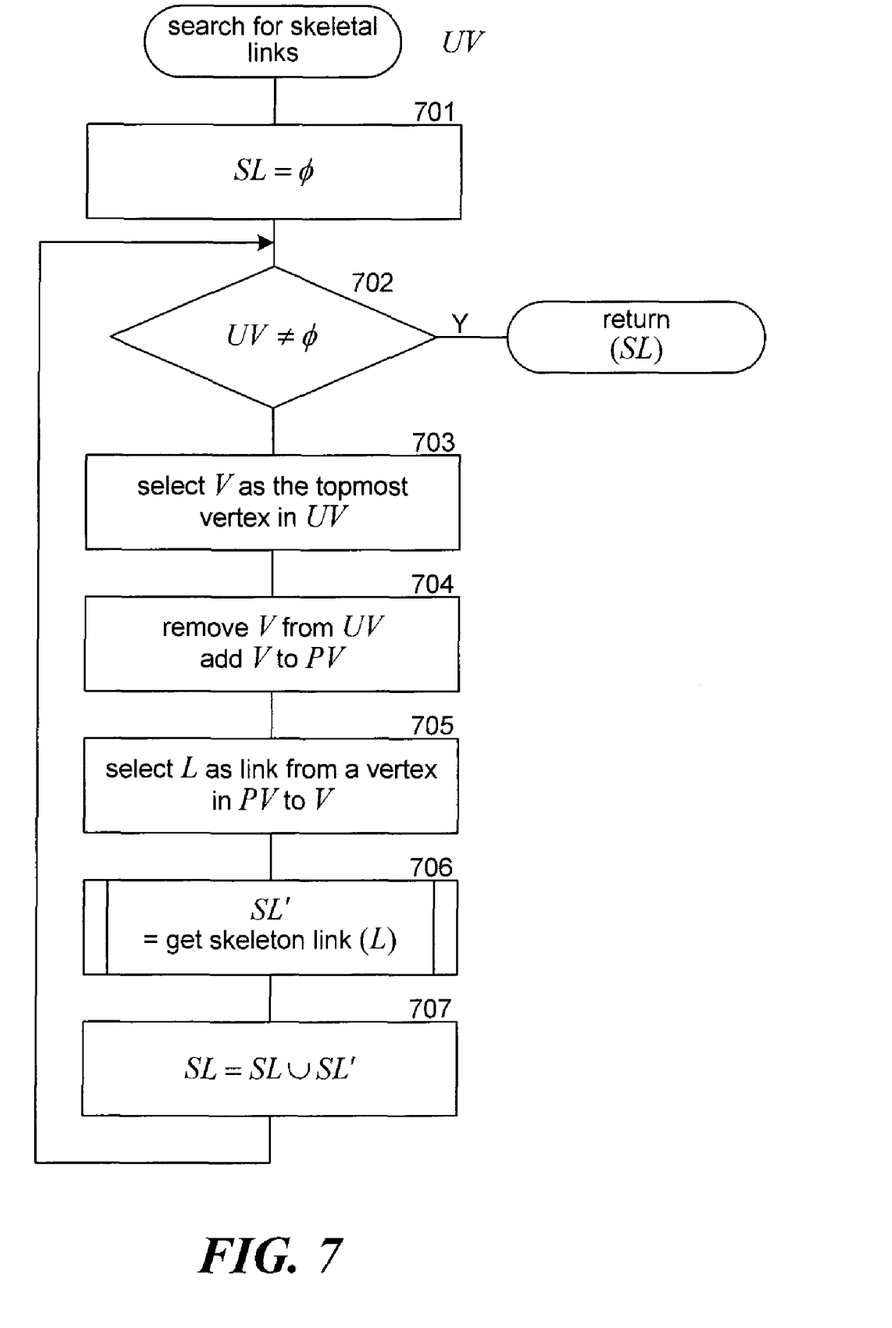
FIG. 7 is a flow diagram that illustrates the processing of the search for skeletal links component of the forum crawler system in some embodiments.

FIG. 7 is a flow diagram that illustrates the processing of the search for skeletal links component of the forum crawler system in some embodiments. The component is passed a list of the vertices UV of the site map. The component loops selecting each vertex and identifying its skeletal links. In block 101, the component initializes a set of skeletal links to empty. In decision block 702, if all the vertices of the site map have been processed, then the component returns the skeletal links, else the component continues at block 703. In block 703, the component selects the topmost vertex (in a hierarchy of vertices) that is left in the list of vertices UV (e.g., unselected vertices). In block 704, the component removes the selected vertex from the list of vertices UV and adds it to a list of vertices PV (e.g., selected or processed vertices). In block 705, the component selects the links from vertices in the list PV and point to the selected vertex V. In block 706, the component invokes the get skeletal link component passing the selected links and receiving a designation of the skeletal links SL' in return. In block 707, the component adds the designation of skeletal links to the list of skeletal links SL and then loops to block 702 to determine whether all the skeletal links have already been processed.

Figure 8:
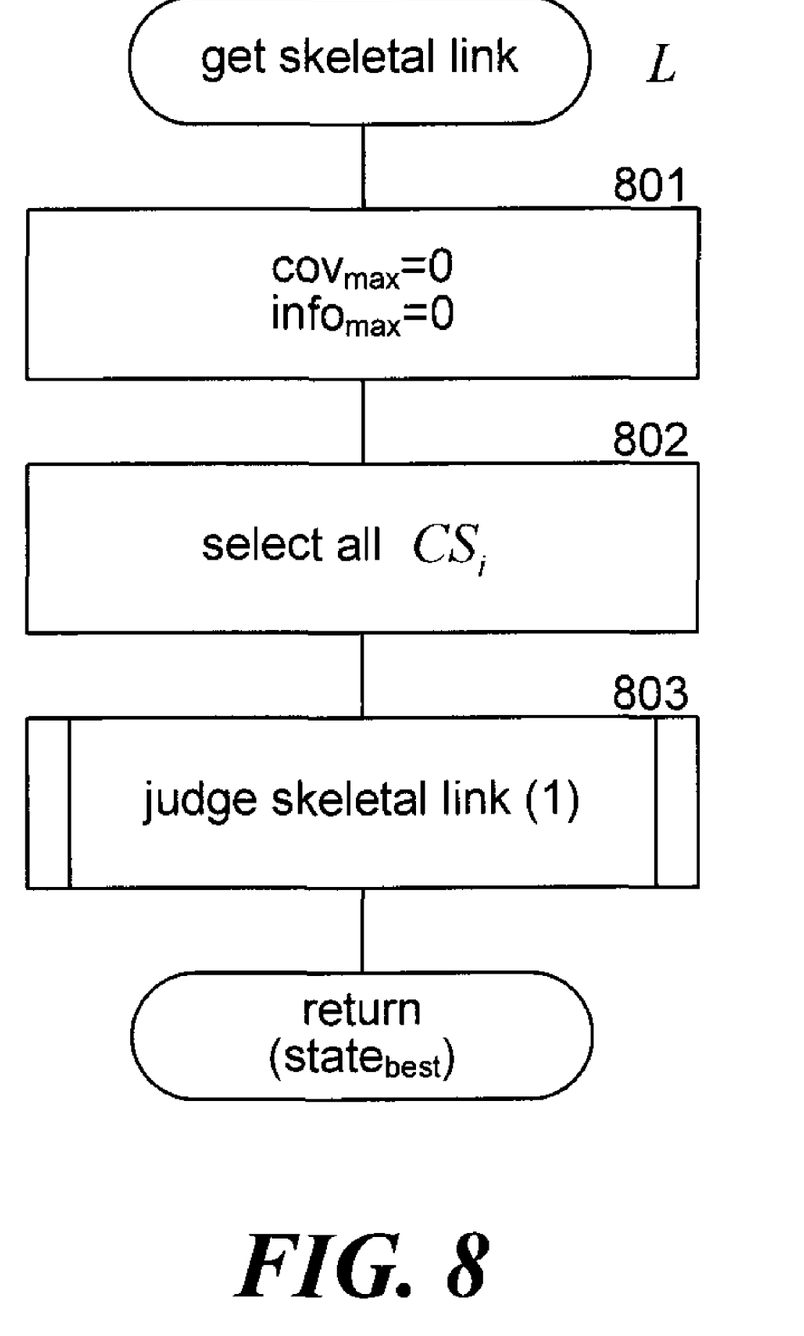
FIG. 8 is a flow diagram that illustrates the processing of the get skeletal link component of the forum crawler system in some embodiments.

FIG. 8 is a flow diagram that illustrates the processing of the get skeletal link component of the forum crawler system in some embodiments. The component is passed a set of links, initializes variables, and then invokes the judge skeletal links component to determine which links are skeletal links. In block 801, the component initializes the maximum coverage measure and informativeness measure encountered so far to zero. In block 802, the component sets the state $CS_i$ for each link to selected. In block 803, the component invokes the judge skeletal link component passing an indication of the first link in the list of links and other links will be processed recursively as described below. The component then returns an indication of the best combination of skeletal links as statebest.

Figure 9:
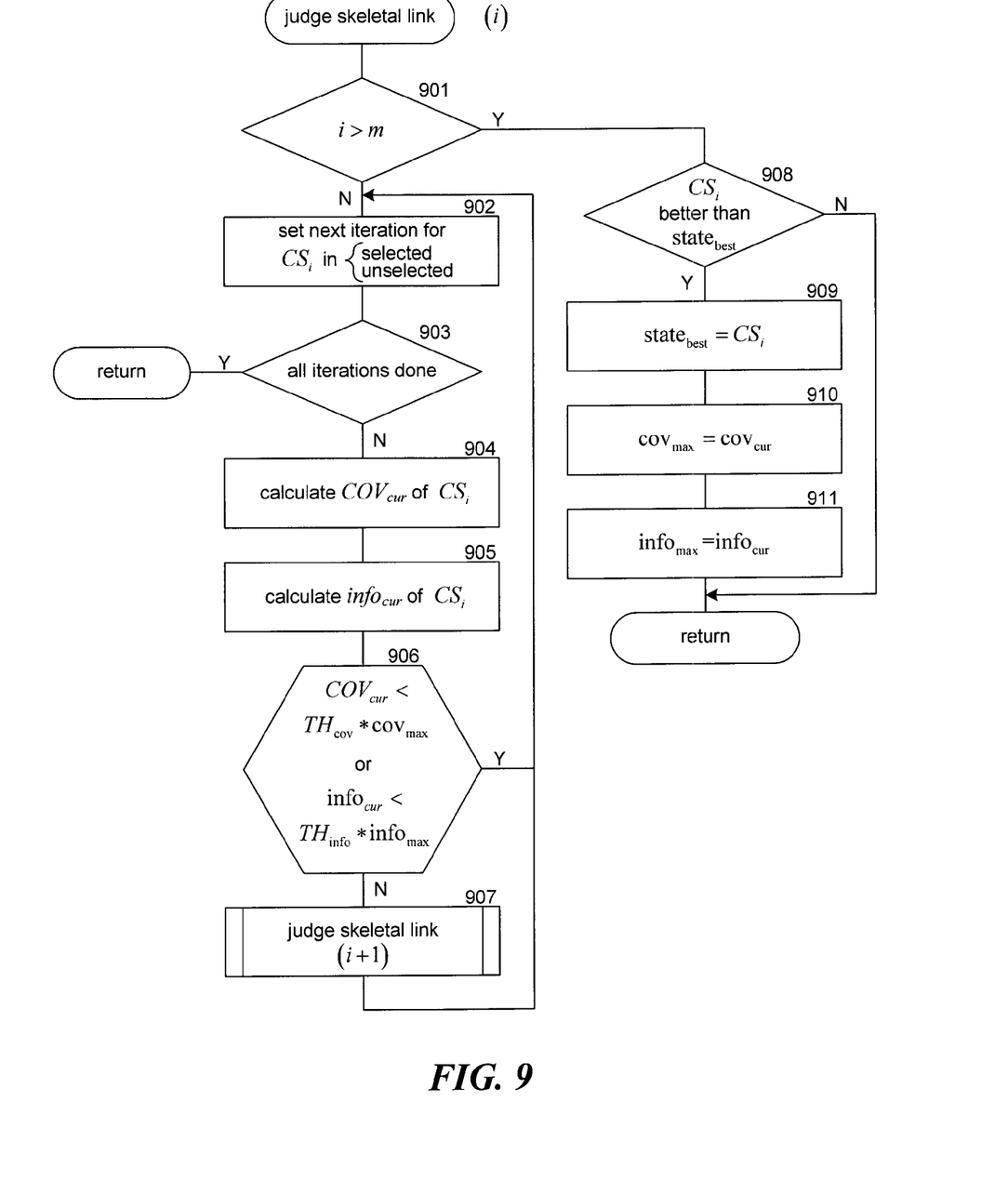
FIG. 9 is a flow diagram that illustrates the processing of the judge skeletal link component of the forum crawler system in some embodiments.

FIG. 9 is a flow diagram that illustrates the processing of the judge skeletal link component of the forum crawler system in some embodiments. The component is passed an indication of an incoming link of a vertex and recursively invokes itself to process the state of the link as selected or unselected. In decision block 901, if the component is passed the last link in the list, then the component continues at block 908, else the component continues at block 902. In blocks 902-907, the component loops determining whether to continue processing the passed link as a selected or unselected link. In block 902, the component selects for the next iteration an indication of whether the state for the passed link is selected or unselected. In decision block 903, if the iterations for selected and unselected are complete, then the component returns, else the component continues at block 904. In block 904, the component calculates the coverage measure for the vertex for the current state of the passed vertex using Equation 1. The component calculates a new K' by traversing the vertex referenced by the passed link and the vertices that have links to that vertex assuming the current combination of skeletal links. In block 905, the component calculates the current informativeness measure for the vertex for the current state of the passed link. In decision block 906, if the coverage measure is less than a threshold of the maximum coverage encountered so far, or the informativeness measure is less than a threshold of the maximum informativeness encountered so far, then the component prunes the binary tree excluding the current state as a possible state for the passed link. In such a case, the component loops to block 902 to select the next current state. Otherwise, the component continues at block 907. In block 907, the component recursively invokes the judge skeletal link component passing the next link in the list to evaluate the binary sub-tree of the passed link. The component then loops to block 902. In decision block 908, if the score for the current state is better than the best encountered so far, then the component continues at block 909, else the component returns. The score can be determined in various ways such as both coverage and informativeness being better. In block 909, the component resets the current best state. In block 910, the component sets the maximum coverage to the current coverage. In block 911, the component sets the maximum informativeness to the current informativeness and then returns.

Figure 10:
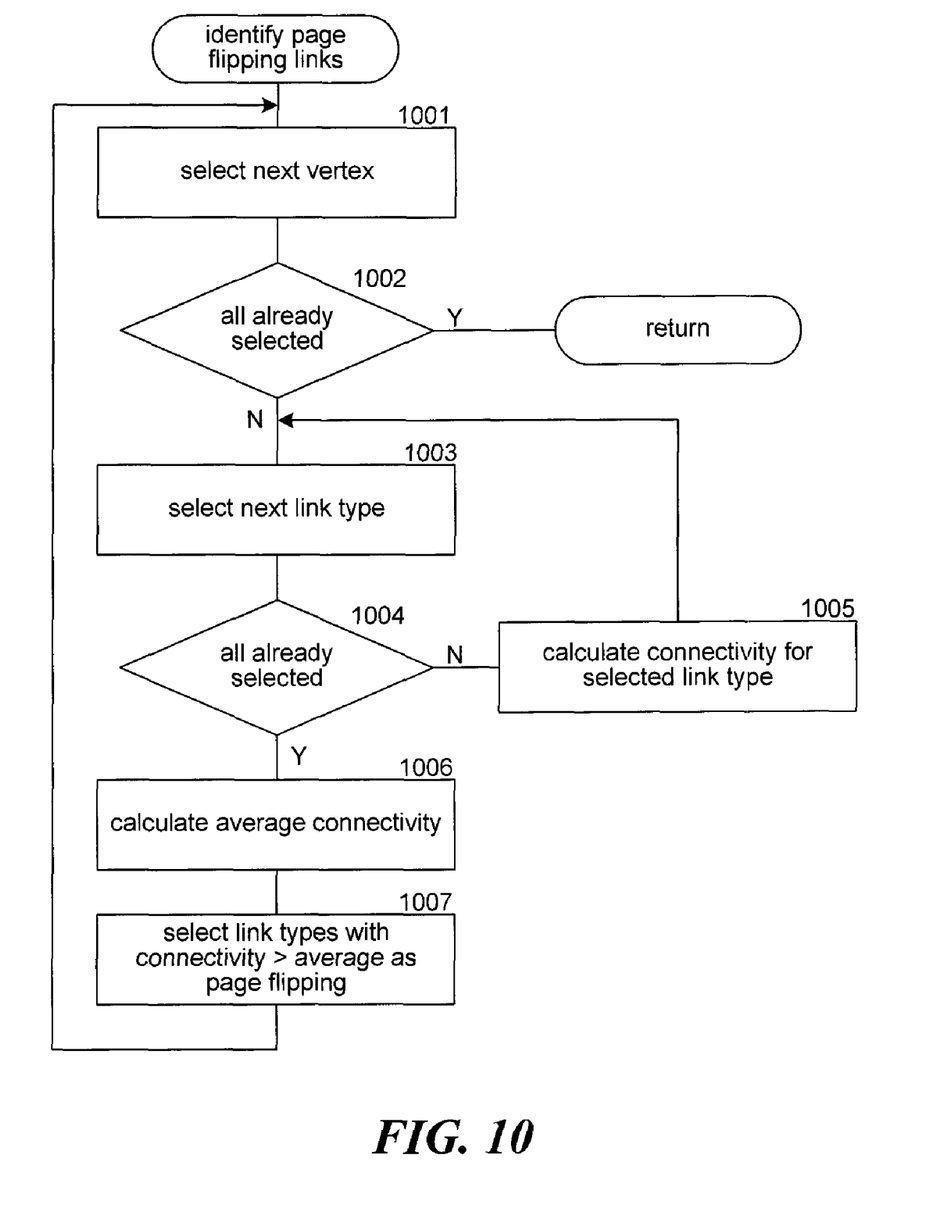
FIG. 10 is a flow diagram that illustrates the processing of the identify page-flipping links component of the forum crawler system in some embodiments.

FIG. 10 is a flow diagram that illustrates the processing of the identify page-flipping links component of the forum crawler system in some embodiments. The component calculates the connectivity of links of the vertices to identify page-flipping links. In block 1001, the component selects a vertex of the site map. In decision block 1002, if all the vertices have already been selected, then the component returns, else the component continues at block 1003. In blocks 1003-1005, the component loops processing each outgoing link of the selected vertex. In block 1003, the component selects the next link. In decision block 1004, if all the links have already been selected, then the component continues at block 1006, else the component continues at block 1005. In block 1005, the component calculates the connectivity for the selected link using Equation 3 and loops to block 1003 to select the next link. In block 1006, the component calculates the average connectivity for all the links. In block 1007, the component selects the links with a conductivity score that is greater than the average as the page-flipping links and then loops to block 1001 to select the next vertex.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, one skilled in the art will appreciate that many different metrics can be used to assess whether a link is an informative link. One skilled in the art will also appreciate that the techniques described herein can be used on web sites other than web forums such as blogs, web communities, news portals, product review web sites, and so on. In general, if a web site is supported by a database, and the web pages are generated by some predefined templates, then the described techniques may be used to assist in crawling those web sites. In addition to their use in crawling a web site, the described techniques can be used for page labeling with the information of page layout features, the page number of the page cluster in the site map, the link structure, and the URL pattern being used to judge whether a page is a list of threads web page, posts of thread web page, user profile page, and so on. The techniques may also be used for data extraction based on clustering and labeling used to guide extraction of data. Accordingly, the invention is not limited except as by the appended claims.

We claim:

1. A method in a computing device for identifying informative links of a web site for use in crawling the web site, the method comprising:
   collecting sample web pages of the web site;
   generating a site map of the web site based on the sample web pages, the site map representing clusters of similar web pages and indications of inter-cluster and intra-cluster links between web pages;
   analyzing the generated site map to identify skeletal links of the web site, the skeletal links being links that support the structure of the web site; and
   after analyzing the generated site map to identify skeletal links of the web site, crawling the web site by following links that are similar to the identified skeletal links and not following other links
   wherein the identifying of skeletal links of the web site is based on assessing the coverage and informativeness of the web pages of a cluster, the coverage of the web pages of a cluster is based on the number of unique web pages in a cluster and the number of unique web pages in the web site, the informativeness of web pages of a cluster is based on the number of web pages in the cluster that are duplicates of other web pages in the cluster and the number of web pages in the cluster.

2. The method of claim 1 wherein the identifying of skeletal links includes evaluating incoming links to a cluster to identify a combination of incoming links as skeletal links using the coverage and informativeness.

3. The method of claim 1 further including analyzing the web pages of a cluster to identify page-flipping links of the cluster.

4. The method of claim 3 including following page-flipping links when crawling the web site.

5. A method in a computing device for identifying informative links of a web site for use in crawling the web site, the method comprising:
   collecting sample web pages of the web site;
   generating a site map of the web site based on the sample web pages, the site map representing clusters of similar web pages and indications of inter-cluster and intra-cluster links between web pages;
   analyzing the generated site map to identify skeletal links of the web site, the skeletal links being links that support the structure of the web site; and
   crawling the web site by following links that are similar to the identified skeletal links and not following other links
   wherein the identifying of skeletal links is based on assessing the coverage and informativeness of the web pages of a cluster and
   wherein the coverage is defined by the following:

$$Cov = \frac{K'}{K} \times 100\%$$

where Cov represents the coverage measure of a cluster, K is greater than zero and represents the number of unique web pages using an exhaustive traversal, and K' represents the number of unique web pages using a non-exhaustive traversal.

6. A method in a computing device for identifying informative links of a web site for use in crawling the web site, the method comprising:
   collecting sample web pages of the web site;
   generating a site map of the web site based on the sample web pages, the site map representing clusters of similar web pages and indications of inter-cluster and intra-cluster links between web pages;
   analyzing the generated site map to identify skeletal links of the web site, the skeletal links being links that support the structure of the web site; and
   crawling the web site by following links that are similar to the identified skeletal links and not following other links
   wherein the identifying of skeletal links is based on assessing the coverage and informativeness of the web pages of a cluster and
   wherein the informativeness is defined by the following:

$$Info = -\frac{1}{\log(N)} \sum_{i=1}^{K} \frac{\|D_i\|}{N} \log\left(\frac{\|D_i\|}{N}\right)$$

where Info represents the informativeness measure of a cluster, $D_i$ represents the $i^{th}$ unique web page within the cluster, $\|D_i\|$ represents the number of duplicate web pages of the unique web page $D_i$, K represents the number of unique web pages in the cluster, and N is greater than zero and represents the number of web pages in the cluster.

7. A method in a computing device for identifying informative links of a web site for use in crawling the web site, the method comprising:
   collecting sample web pages of the web site;
   generating a site map of the web site based on the sample web pages, the site map representing clusters of similar web pages and indications of inter-cluster and intra-cluster links between web pages;
   analyzing the web pages of a cluster to identify page-flipping links of the cluster;
   analyzing the generated site map to identify skeletal links of the web site, the skeletal links being links that support the structure of the web site; and crawling the web site by following links that are similar to the identified skeletal links and not following other links wherein the identifying of page-flipping links is based on connectivity of a cluster for a certain link type, when the cluster has at least one link of that certain link type, based on the following:

$$Con = \frac{\sum_{\{A,B\}} \text{Path}(A, B) \cdot \text{Path}(B, A)}{\sum_{\{A,B\}} \text{Path}(A, B)}$$

where (A,B) represents a pair of web pages Path(A, B) is 1 when there is a path of that certain link type from web page A to web page B and is 0 otherwise, and $\Sigma_{\{A,B\}}\text{Path}(A, B)$ is greater than zero.

8. The method of claim 7 wherein when the connectivity for a type of link is greater that the average connectivity for all types of links, designating the type of link as a page-flipping link.

9. A computer-readable storage medium encoded with instructions for controlling a computing device to identify informative links of a web site for use in crawling, by a method comprising:
collecting sample web pages of the web site;
generating a site map of the web site based on the sample web pages, the site map representing clusters of similar web pages and indications of inter-cluster and intra-cluster links of the web pages, each link representing similar types of links on web pages;
analyzing the generated site map to identify skeletal links of the web site, the skeletal links being links that support the structure of the web site, the skeletal links being identified based on coverage and informativeness;
analyzing the web pages of the clusters to identify page-flipping links of the cluster based on connectivity; and
crawling the web site by following links that are similar to the identified skeletal links and similar to page-flipping links and not following other links.

10. The computer-readable medium of claim 9 wherein the coverage is defined by the following:

$$Cov = \frac{K'}{K} \times 100\%$$

where Cov represents the coverage measure of the cluster, K is greater than zero and represents the number of unique web pages using an exhaustive traversal of the web site, and K' represents the number of unique web pages using a non-exhaustive traversal.

11. The computer-readable medium of claim 9 wherein the informativeness is defined by the following:

$$\text{Info} = -\frac{1}{\log(N)} \sum_{i=1}^{K} \frac{\|D_i\|}{N} \log\left(\frac{\|D_i\|}{N}\right)$$

where Info represents the informativeness measure of a cluster, $D_i$ represents the $i^{th}$ unique web page within the cluster, and $\|D_i\|$ represents the number of duplicate web pages of the unique web page $D_i$, K represents the number of unique web pages in the cluster, and N is greater than zero and represents the number of web pages in the cluster.

12. The computer-readable medium of claim 9 wherein the identifying of page-flipping links is based on connectivity of a cluster for a certain link type, when the cluster has at least one link of that certain link type, when the cluster has at least one link of that certain link type, based on the following:

$$Con = \frac{\sum_{\{A,B\}} \text{Path}(A, B) \cdot \text{Path}(B, A)}{\sum_{\{A,B\}} \text{Path}(A, B)}$$

where (A,B) represents a pair of web pages Path(A, B) is 1 when there is a path of that certain link type from web page A to web page B and is 0 otherwise, and $\Sigma_{\{A,B\}}\text{Path}(A, B)$ is greater than zero.

13. The computer-readable medium of claim 9 wherein when the connectivity for a type of link is greater that the average connectivity for all types of links, designating the type of link as a page-flipping link.

14. The computer-readable medium of claim 9 wherein the identifying of skeletal links includes evaluating incoming links to a cluster to identify a combination of incoming links as skeletal links using the coverage and informativeness.

15. A computing device for identifying informative links of a web site for use in crawling the web site, comprising:
a memory storing computer-executable instructions of:
a component that collects sample web pages of the web site;
a component that generates a site map of the web site based on the sample web pages, the site map representing clusters of similar web pages and indications of inter-cluster and intra-cluster links of the web pages;
a component that analyzes the generated site map to identify skeletal links of the web site, the skeletal links being links that support the structure of the web site, the skeletal links being identified based on coverage and informativeness; and
a component that analyzes the web pages of the clusters to identify page-flipping links of the cluster based on connectivity
wherein the skeletal links and page-flipping links represent informative links; and
wherein when the connectivity for a type of link is greater that the average connectivity for all types of links, designating the type of link as a page-flipping link; and
a processor that executes the computer-executable instructions stored in the memory.

16. A computing device for identifying informative links of a web site for use in crawling the web site, comprising:
a memory storing computer-executable instructions of:
a component that collects sample web pages of the web site;
a component that generates a site map of the web site based on the sample web pages, the site map representing clusters of similar web pages and indications of inter-cluster and intra-cluster links of the web pages;
a component that analyzes the generated site map to identify skeletal links of the web site, the skeletal links being links that support the structure of the web site, the skeletal links being identified based on coverage and informativeness; and a component that analyzes the web pages of the clusters to identify page-flipping links of the cluster based on connectivity wherein the skeletal links and page-flipping links represent informative links; and wherein the identifying of skeletal links includes evaluating incoming links to a cluster to identify a combination of incoming links as skeletal links using the coverage and informativeness; and a processor that executes the computer-executable instructions stored in the memory.

17. A computing device for identifying informative links of a web site for use in crawling the web site, comprising:

a memory storing computer-executable instructions of:

a component that collects sample web pages of the web site;

a component that generates a site map of the web site based on the sample web pages, the site map representing clusters of similar web pages and indications of inter-cluster and intra-cluster links of the web pages;

a component that analyzes the generated site map to identify skeletal links of the web site, the skeletal links being links that support the structure of the web site, the skeletal links being identified based on coverage and informativeness;

a component that analyzes the web pages of the clusters to identify page-flipping links of the cluster based on connectivity; and a component that crawls the web site by following links that are similar to the identified skeletal links and similar to page-flipping links and not following other links, and wherein when the connectivity for a type of link is greater that the average connectivity for all types of links, designating the type of link as a page-flipping link, and wherein the identifying of skeletal links includes evaluating incoming links to a cluster to identify a combination of incoming links as skeletal links using the coverage and informativeness wherein the skeletal links and page-flipping links represent informative links; and a processor that executes the computer-executable instructions stored in the memory.

* * * * *